United States Patent
Nayar et al.

(10) Patent No.: US 7,516,530 B2
(45) Date of Patent: Apr. 14, 2009

(54) METHOD FOR PICKING AND PLACING A CLINGING PART

(75) Inventors: Sham S. Nayar, Savage, MN (US); James J. Stirn, Savage, MN (US); Terrence L. Grewe, White Bear Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 141 days.

(21) Appl. No.: 11/501,799

(22) Filed: Aug. 9, 2006

(65) Prior Publication Data
US 2006/0265866 A1 Nov. 30, 2006

Related U.S. Application Data

(62) Division of application No. 10/178,633, filed on Jun. 24, 2002, now Pat. No. 7,114,243.

(60) Provisional application No. 60/350,798, filed on Jan. 22, 2002.

(51) Int. Cl.
*B21D 39/03* (2006.01)
*B23P 11/00* (2006.01)

(52) U.S. Cl. .................. 29/428; 29/469; 29/603.03; 29/729; 29/739; 901/30; 901/31

(58) Field of Classification Search .................. 29/428, 29/469, 603.03, 729, 739, 792, 799; 901/30, 901/31
See application file for complete search history.

(56) References Cited

U.S. PATENT DOCUMENTS

| 3,630,391 A | * | 12/1971 | Wilson | .................. | 414/744.8 |
|---|---|---|---|---|---|
| 4,545,723 A | | 10/1985 | Clark | .......................... | 414/730 |
| 4,626,013 A | | 12/1986 | Barrows | ....................... | 294/88 |
| 4,845,834 A | * | 7/1989 | Watson | ......................... | 483/31 |
| 4,878,705 A | * | 11/1989 | Arnquist | ..................... | 294/116 |
| 5,588,688 A | | 12/1996 | Jacobsen et al. | ............ | 294/106 |
| 5,671,961 A | * | 9/1997 | Buck | .......................... | 294/116 |
| 5,765,820 A | * | 6/1998 | Marusiak | ........................ | 269/6 |
| 5,768,768 A | | 6/1998 | Best | ............................ | 29/792 |
| 5,938,902 A | | 8/1999 | Nguyen et al. | ......... | 204/298.15 |
| 6,049,969 A | | 4/2000 | Jenkins et al. | ................ | 29/737 |
| 6,116,118 A | * | 9/2000 | Wesch, Jr. | ................... | 81/57.34 |
| 6,119,972 A | | 9/2000 | Vogel et al. | | |
| 6,260,261 B1 | | 7/2001 | Marks et al. | .................. | 29/740 |

OTHER PUBLICATIONS

"3-D firm grasps with the SCROLLIC gripper"; Rosa, P.F.F.; Okada, T.; Robotics and Automation, 1995, Proceedings, 1995 IEEE International Conference on, vol. 2, May 21-27, 1995. pp. 1662-1667.

* cited by examiner

*Primary Examiner*—Paul D Kim
(74) *Attorney, Agent, or Firm*—Westman, Champlin & Kelly, P.A.

(57) ABSTRACT

A method for picking and placing a clinging part. Gripper fingers spaced apart from each other by a central spacing on each of first and second gripper jaws are provided. The gripper jaws are moved between a grip position in which the gripper jaws grip the clinging part and a release position in which the gripper jaws release and retract from the clinging part. An ejector having a cling resistant part pusher movable in the central spacings is moved between a retracted position in which the part pusher is retracted and contacts the clinging part. and an eject position in which the part pusher ejects the clinging part.

9 Claims, 5 Drawing Sheets

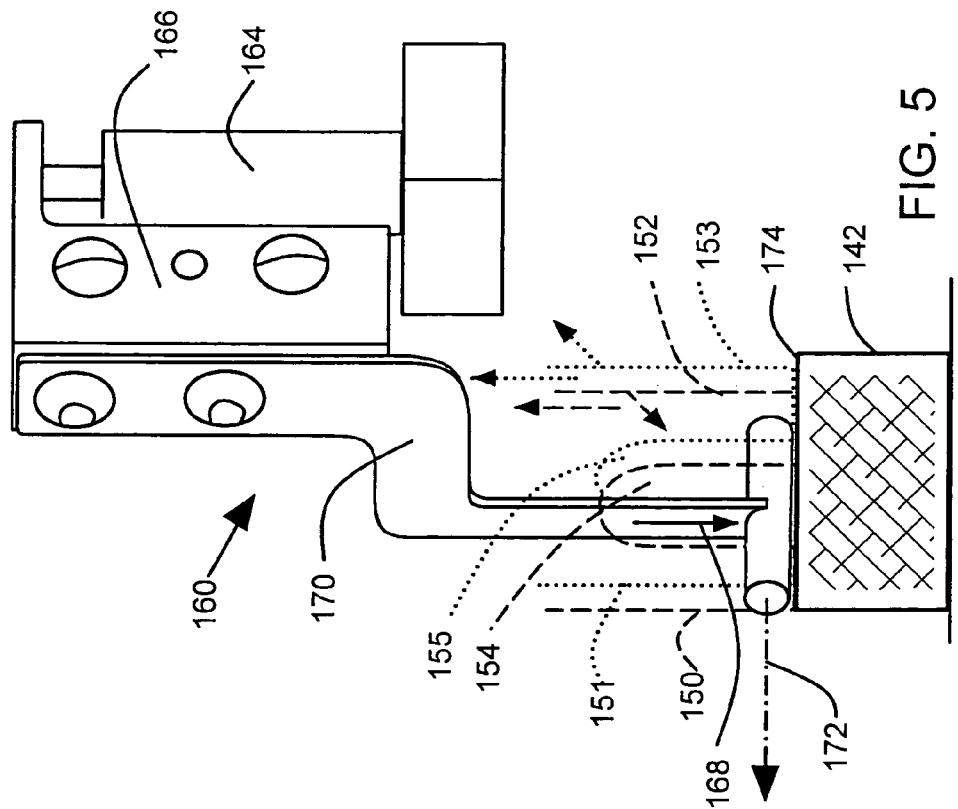
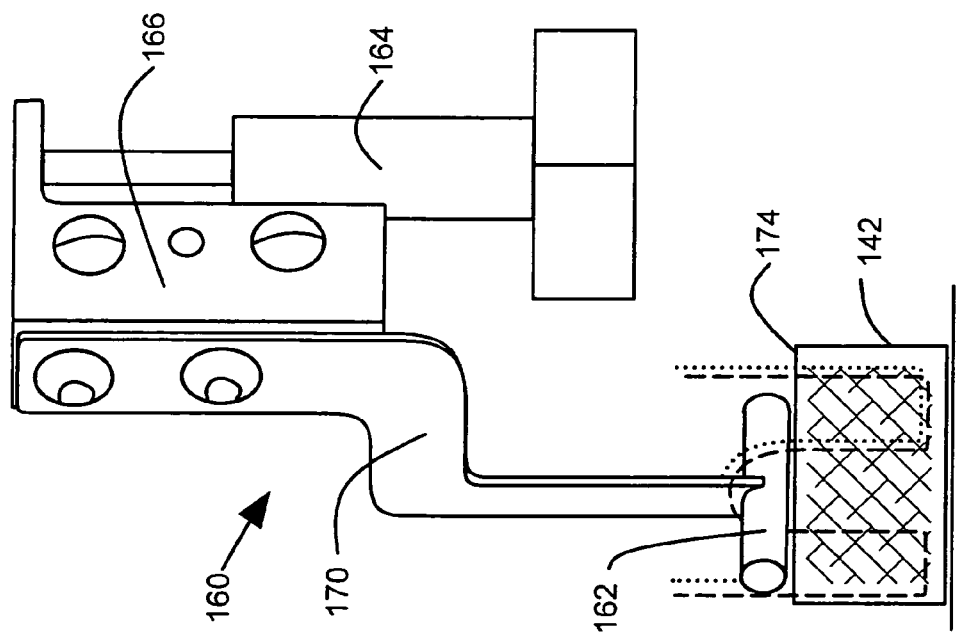
FIG. 4
FIG. 5

METHOD FOR PICKING AND PLACING A CLINGING PART

CROSS REFERENCE TO RELATED APPLICATION

The present application is a Divisional of and claims priority of U.S. patent application Ser. No. 10/178,633, titled "Gripper with Parts Ejector System", filed Jun. 24, 2002, now U.S. Pat. No. 7,114,243, the content of which is hereby incorporated by reference in its entirety, which claims priority benefits from U.S. Provisional Application 60/350,798 titled "Gripper with Parts Ejector System," filed Jan. 22, 2002.

FIELD OF THE INVENTION

The present invention relates generally to methods and robotic tools for automatic assembly. In particular, the present invention relates to picking and placing a recirculation filter in a magnetic storage drive.

BACKGROUND OF THE INVENTION

Recirculation filters used in disc drives are typically formed of fibers that are permanently electrostatically charged to attract and hold small particles. Recirculation filters tend to cling to fingers, tools and other objects used in assembling disc drives. The clinging tends to make it difficult to insert the recirculation filters in slots in a disc drive assembly without inadvertently misplacing the filters which tend to cling to and follow fingers or tools as they are withdrawn after insertion. There is a desire to automate the insertion of recirculation filters and other clinging parts, however, this is difficult to do reliably because of the possibility of misplacement of the filter.

A method and apparatus are needed to automatically pick and place a clinging part such as a recirculation filter in a reliable manner.

SUMMARY OF THE INVENTION

Disclosed is a robotic tool and a method of using a robotic tool to pick and place a clinging part in an assembly. The robotic tool includes first and second gripper jaws. Each gripper jaw includes gripper fingers spaced apart from each other by a central spacing. The gripper jaws are movable between a grip position in which the gripper jaws grip the clinging part and a release position in which the gripper jaws release and retract from the clinging part.

The robotic tool also includes an ejector. The ejector has a part pusher that is cling resistant and movable in the central spacings between a retracted position in which the part pusher is retracted, and an eject position in which the part pusher ejects the clinging part.

These and various other features as well as advantages that characterize the present invention will be apparent upon reading of the following detailed description and review of the associated drawings.

BRIEF DESCRIPTION OF THE DRAWINGS

FIG. 4 schematically illustrates a close up view of an ejector in a retracted position.

FIG. 5 schematically illustrates a close up view of an ejector in an eject position.

DETAILED DESCRIPTION OF ILLUSTRATIVE EMBODIMENTS

In the embodiments described below, a method and robotic tool for picking and placing a clinging part are disclosed. Recirculation filters used in disc drives are made of electrostatically charged fibers and tend to cling to fingers, tools or other objects due to electrostatic attraction. The clinging makes the parts difficult to insert using automatic insertion equipment because the part has a tendency to cling to tools as the tools are retracted after the part is inserted in an assembly. In the embodiments described below in FIGS. 2-6, automatic insertion is achieved using a robotic tool that includes gripper jaws for grasping and placing the part in an assembly, and also an ejector that includes a cling resistant part pusher that holds the part in place as the gripper jaws are retracted. The part pusher, which is shaped and positioned to resist clinging to the part, can then be retracted without disturbing the position of the part in the assembly.

Figure 1:
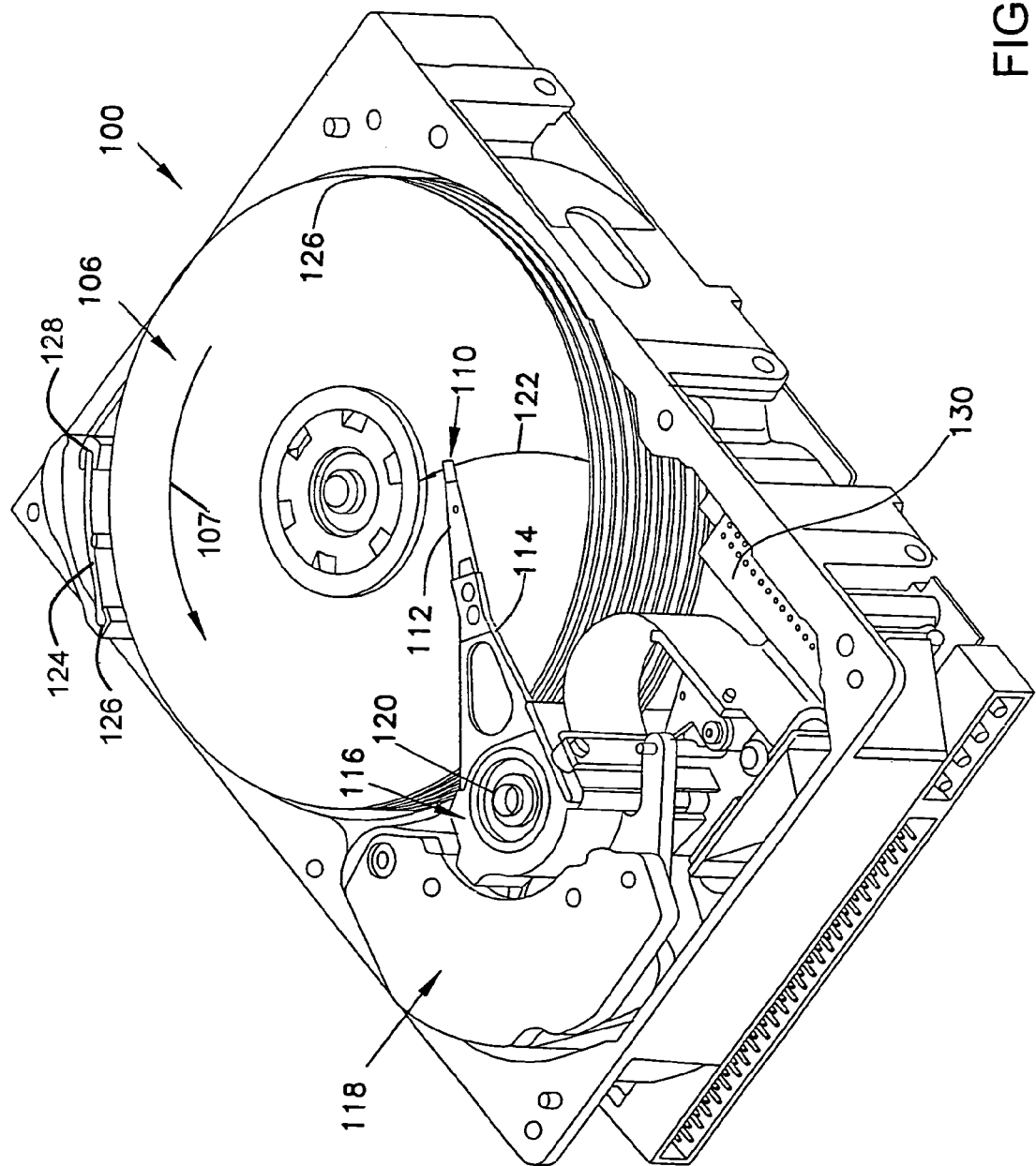
FIG. 1 illustrates a top isometric view of a PRIOR ART disc drive.

FIG. 1 illustrates an embodiment of a PRIOR ART disc drive 100 including a slider or head 110 that includes one or more read/write transducers. Disc drive 100 includes a disc pack 126 having storage media surfaces (disc surfaces) 106 that are typically layers of magnetic material. The disc pack 126 includes a stack of multiple discs. A head assembly 112 includes the head 110 with a read/write transducer for each stacked disc. Disc pack 126 is spun or rotated as shown by arrow 107 to allow head assembly 112 to access different rotational locations for data on the storage surfaces 106 on the disc pack 126.

The head assembly 112 is actuated to move radially, relative to the disc pack 126, as shown by arrow 122 to access different radial locations for data on the disc surfaces 106 of disc pack 126. Typically, the actuation of the head assembly 112 is provided by a voice coil motor 118. Voice coil motor 118 includes a rotor 116 that pivots on axle 120 and an arm or beam 114 that actuates the head assembly 112. The head assembly 112 presses down on a central gimbal point on the head 110, providing a load force that holds the head 110 in close proximity to the storage surface 106. One or more read/write transducers are deposited on the head 110 and fly above the disc surface 106 at a fly height. A circuit at location 130 provides an electric current to the voice coil motor 118 to control the radial position of the head 110 and electrically interfaces read/write transducers on heads 110 with a computing environment.

The disc drive 100 also includes a recirculation filter 124. The recirculation filter typically comprises polypropylene fibers contained in an outer scrim made of layers of spun or extruded polypropylene, polyester or polyethylene. The recirculation filter is typically sponge-like, flexible and permanently electrostatically charged. The recirculation filter 124 is manually picked up and placed or inserted in mounting slots 126, 128 in the disc drive 100. The recirculation filter 124 is a part that tends to cling to fingers, tools or other objects that come in contact with it due to either electrostatic attraction, snagging of fibers, or a combination of both. Because of its clinging characteristics, the recirculation filter 124 has typically been inserted in slots 126, 128 using manual methods to ensure that it is not inadvertently partially withdrawn after insertion by clinging to an operator's hand or tool. There is a desire to automate the picking and placing of clinging parts such as recirculation filter 124 in order to implement factory of future (FOF) robotic techniques on an automatic production line.

As described below in connection with FIGS. 2-5, a method and robotic tool are disclosed for picking and placing clinging parts such as recirculation filter 124 in a disc drive on an automatic production line.

FIGS. 2-5 schematically illustrates a robotic tool 140 gripping a clinging part 142, such as a recirculation filter, and inserting the clinging part 142 in an assembly 144, such as a disc drive. The robotic tool 140 operates on an automated assembly line and picks up and automatically places the clinging part 142.

The robotic tool 140 comprises first and second gripper jaws 146, 148. Each gripper jaw 146, 148 includes opposing gripper fingers 150, 152, 151, 153 spaced apart from each other by a central spacing 154, 155. The gripper jaws 146, 148 are movable between a grip position (illustrated in FIGS. 24) in which the gripper jaws 146, 148 grip the clinging part 142 and a release position (illustrated in FIG. 5) in which the gripper jaws 146, 148 release and retract from the clinging part 142. the gripper fingers 150, 151, 152, 153 have a relatively large surface area that grips the clinging part 142. This large surface area, which faces the clinging part 142, tends to generate a relatively large electrostatic clinging force between the clinging part 142 and the gripper fingers 150, 151, 152, 153.

The robotic tool 140 has an ejector 160 that includes a cling-resistant part pusher 162 (shown best in FIGS. 4-5) that is movable in the central spacings 154, 155 between a retracted position (illustrated in FIG. 4) in which the part pusher 162 is retracted, and an eject position (illustrated in FIG. 5) in which the part pusher 162 ejects the clinging part 142.

Preferably, the ejector 160 is in a retracted position when the gripper jaws 146, 148 grip the clinging part 142 (as illustrated in FIG. 4), and the ejector 160 is in an eject position when as the gripper jaws release and retract from the clinging part 142 (as illustrated in FIG.5).

In a further preferred arrangement, the ejector 160 further comprises an ejector actuator 164 mounted on the first gripper jaw 146. the ejector actuator 164 is preferably a small air cylinder as illustrated. The ejector actuator 164 actuates the part pusher 162 to the retracted position as illustrated in FIG. 4. The ejector 160 further comprises a mass 166 coupled to the part pusher and providing a weight force 168 moving the part pusher 160 to the eject position illustrated in FIG. 5. An arm 170 couples between the part pusher 162 and the mass 166. The mass 166 is slidably mounted to the first gripper jaw 146 and gravity holds the ejector 160 down when the actuator 165 is retracted. The weight of the mass 166 is selected to provide enough force to overcome sliding friction and hold the recirculation filter 142 down without providing an excessive force that would otherwise crush the recirculation filter 142. The gripper jaws 146,148 open to release the clinging part 142 and then the gripper jaws 146, 148 retract away from the clinging part 142. The weight force 168 applied by the part pusher 162 holds the clinging part 142 down until the gripper jaws 146, 148 are clear of the clinging part 142.

Figure 2:
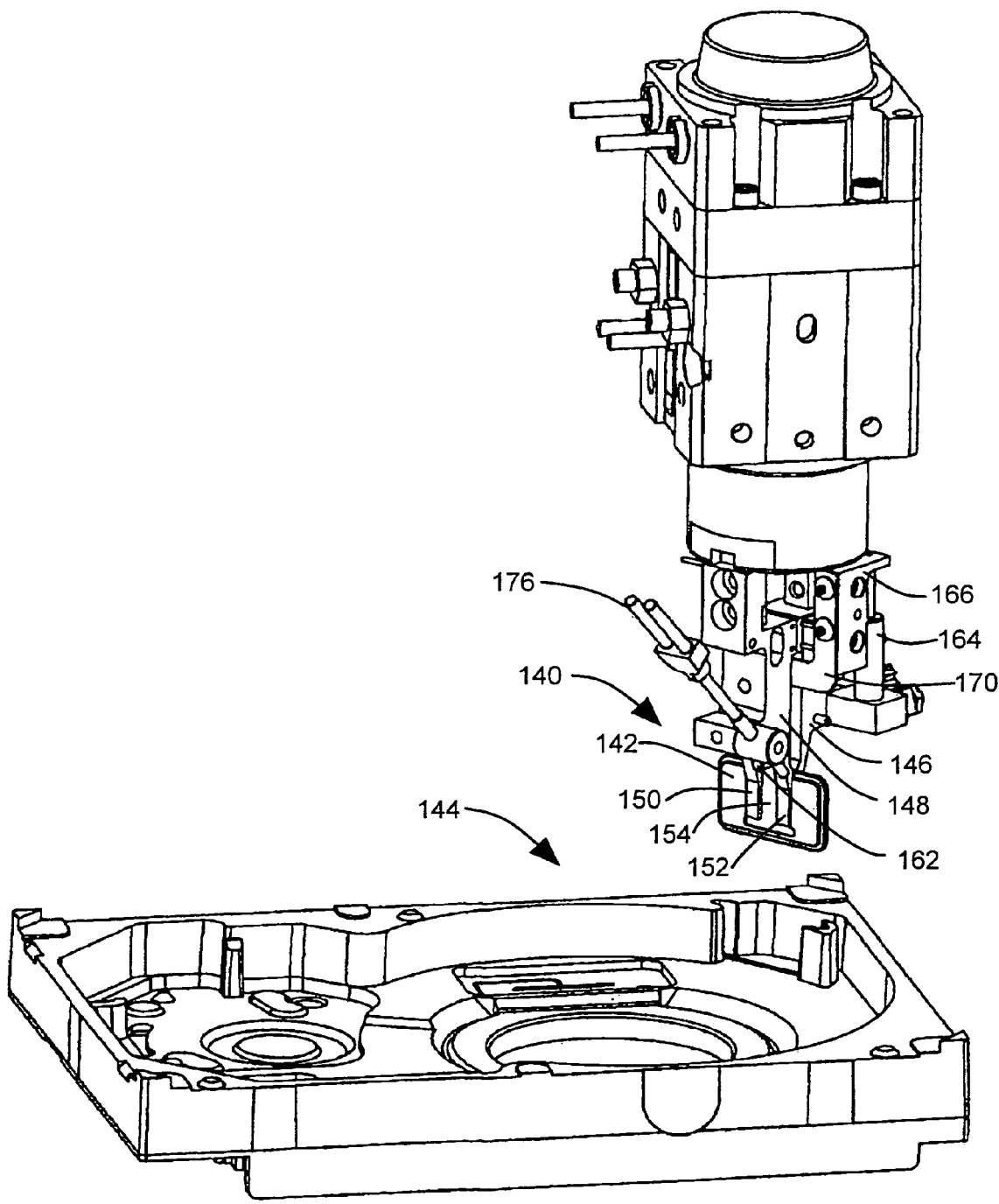
FIG. 2 schematically illustrates a robotic tool gripping a recirculation filter for a disc drive.
Figure 3:
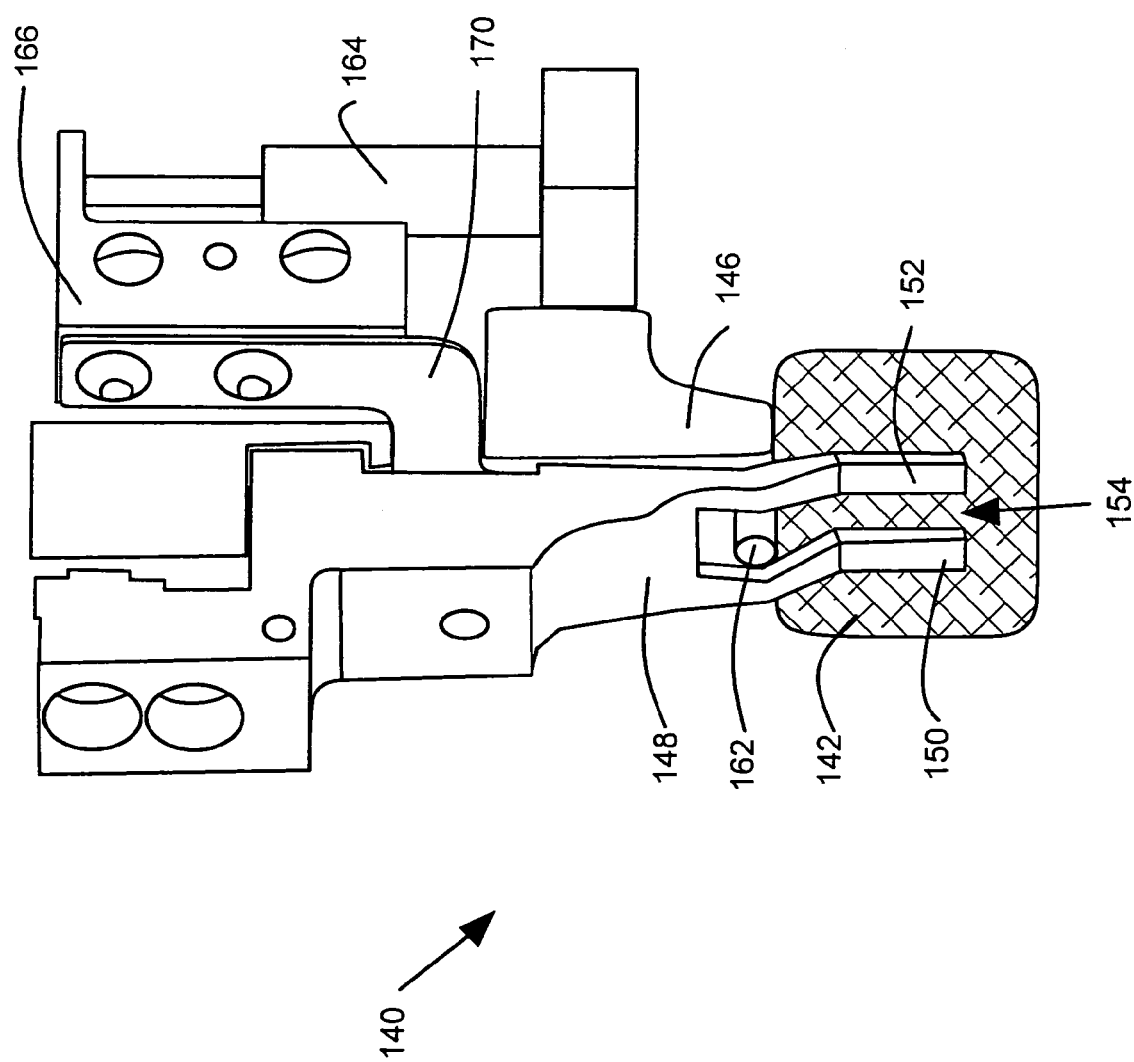
FIG. 3 schematically illustrates a dose up view of a robotic tool gripping a recirculation filter.

In a further preferred arrangement, the first and second gripper jaws 146, 148 are shaped to pick and place a recirculation filter 142 in a disc drive 144 as illustrated in FIG. 2. The gripper jaws 146, 148 have gripper fingers 150, 151, 152, 153 with large flat surfaces contacting the recirculation filter 142 over a large contact area. The part pusher 162, on the other hand, is shaped to reduce electrostatic attraction between part pusher 162 and the recirculation filter 142. The part pusher 162 is also shaped to reduce snagging fibers protruding from the recirculation filter 142. The part pusher 162 is shaped as a cylinder having a major axis 172 that is transverse to an upper edge 174 of the recirculation filter 142. The electrostatic capacitance and electrostatic force between the part pusher 162 and the recirculation filter is small because only a very small portion of the part pusher directly faces the recirculation filter upper edge 174.

If desired, the robotic tool 140 can also include a part check sensor 176 mounted on the second gripper jaw 148 to sense presence of a clinging 142 part between the gripper fingers 150, 151, 152, 153. The part check sensor 176 can be coupled to a control system (not illustrated) that multidimensionally controls the motion of the robotic tool 140. An SMC control system can be used for example.

Figure 6:
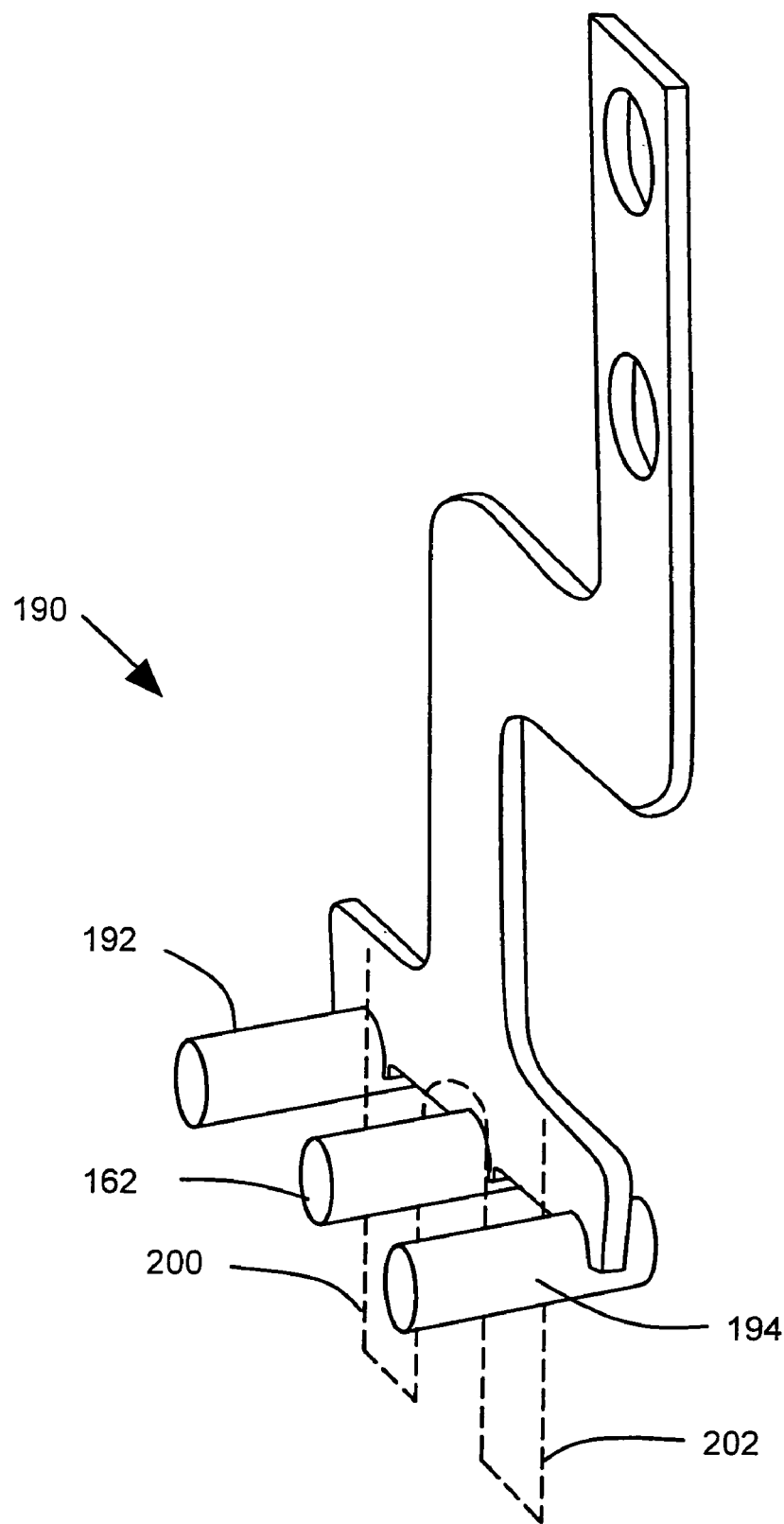
FIG. 6 schematically illustrates a view of an alternative embodiment of an ejector.

FIG. 6 schematically illustrates a view of an alternative embodiment of an ejector 190. The ejector 190 is similar to the ejector 160 described above in connection with FIGS. 4-5. The ejector 190 comprises a central cling resistant part pusher 162, however, ejector 190 also comprises second and third cling resistant part pusher 192, 194. The second cling resistant part pusher 192 is movable adjacent a first outer side 200 of the gripper fingers. The third cling resistant part pusher 194 is movable adjacent a second outer side 202 of the gripper fingers. The ejector 190 illustrated in FIG. 6 has the advantage of more precise and reliable horizontal leveling in placing a clinging part, particularly when the clinging part is not horizontally level when it is picked from a parts tray.

In summary, a robotic tool (140) picks and places a clinging part (142) in an assembly (144). Two gripper jaws (146, 148) each have gripper fingers (150, 151, 152, 153) spaced apart from each other by a central spacing (154, 155). The gripper jaws (146) are movable between a grip position (FIG. 4) and a release position (FIG. 5). The robotic tool (140) also has an ejector (160). The ejector (160) has a part pusher (162) that is cling resistant and movable in the central spacing (154) between a retracted position (FIG. 4), and an eject position (FIG. 5) in which the cling resistant part pusher (162) ejects the clinging part (142).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular clinging part and assembly for the robotic tool while maintaining substantially the same functionality without departing from the scope and spirit of the present invention. For example, the pusher may take a variety of shapes and positions that have a reduced electrostatic attraction to the clinging part. In addition, although the preferred embodiment described herein is directed to a thin, flat recirculation filter, it will be appreciated by those skilled in the art that the shapes of the grippers and ejector can be adjusted depending on the shape and size of the clinging part. The teachings of the present invention can be applied to other assembly applications, like tape drives, without departing from the scope and spirit of the present invention.

What is claimed is:

1. A method for picking and placing a clinging part, comprising:

providing gripper fingers spaced apart from each other by a central spacing on each of first and second gripper jaws;

moving the gripper jaws between a grip position in which the gripper jaws grip the clinging part and a release position in which the gripper jaws release and retract from the clinging part;

providing a cling resistant part pusher shaped to reduce electrostatic attraction between the part pusher and the clinging part; and moving an ejector having the cling resistant part pusher movable in the central spacings between a retracted position in which the part pusher is retracted, and an eject position in which the part pusher ejects the clinging part.

2. The method of claim 1 wherein, the first and second gripper jaws are shaped to pick and place a recirculation filter in a disc drive.

3. The method of claim 2 wherein, the part pusher is shaped as a cylinder having a major axis that is transverse to an upper edge of the recirculation filter.

4. The method of claim 2 wherein:

a part check sensor is arranged on the second gripper jaw to sense presence of the clinging part between the gripper fingers.

5. The method of claim 1 wherein, the part pusher is shaped to reduce snagging fibers protruding from the clinging part.

6. The method of claim 1 wherein moving the ejector includes:

moving a second cling resistant part pusher movable on a first outer side of the gripper fingers between a retracted position in which the second part pusher is retracted and contacts the clinging part, and an eject position in which the second part pusher ejects the clinging part.

7. The method of claim 6 wherein moving the ejector includes:

moving a third cling resistant part pusher movable on a second outer side of the gripper fingers between a retracted position in which the third part pusher is retracted and contacts the clinging part, and an eject position in which the third part pusher ejects the clinging part.

8. The method of claim 1, further comprising:

providing the part pusher with a cylindrical shape having a major axis that is transverse to an upper edge of the recirculation filter.

9. The method of claim 1 further comprising:

arranging a part check sensor on the second gripper jaw to sense presence of the clinging part between the gripper fingers.

* * * * *